Patented Mar. 8, 1949

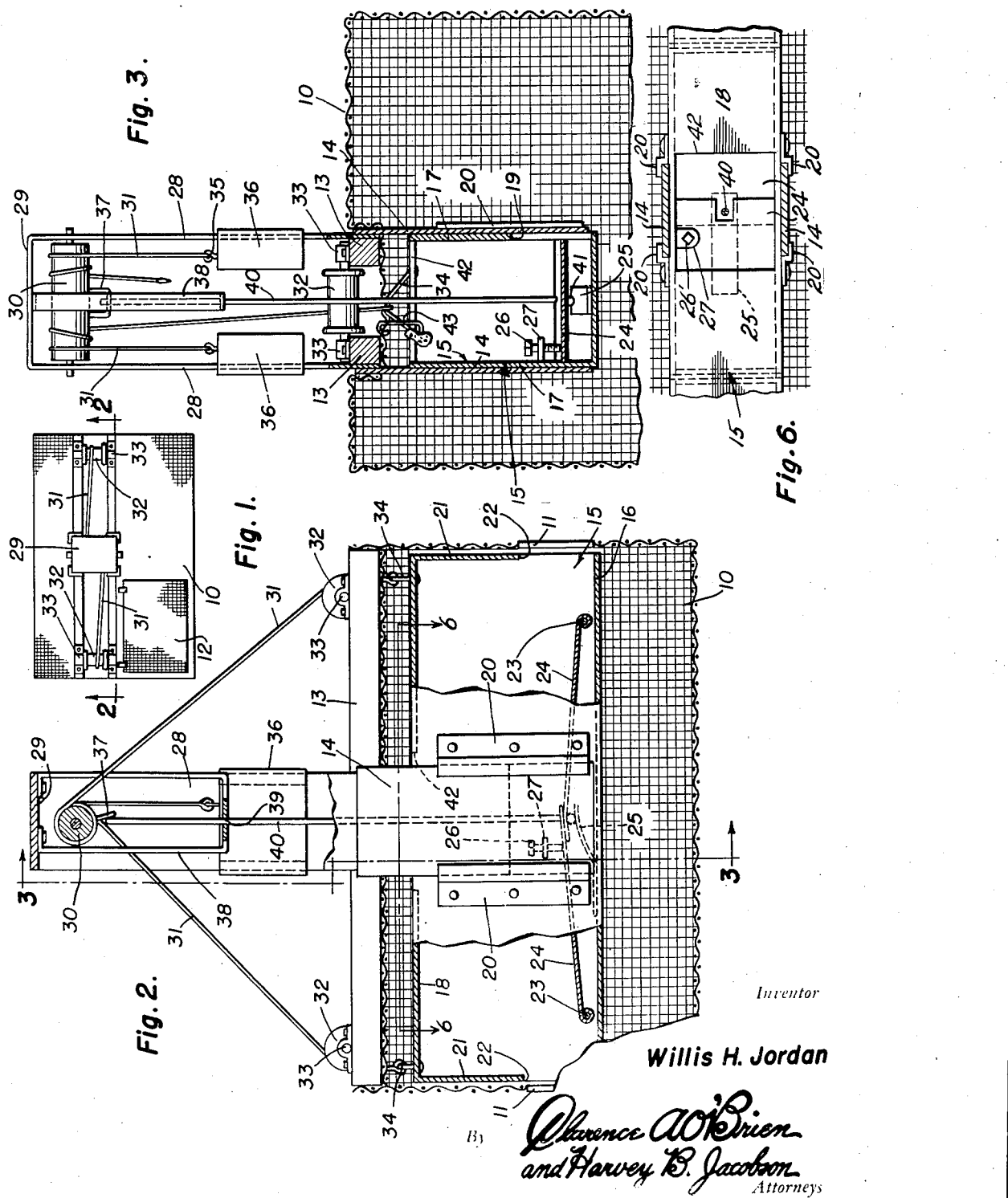

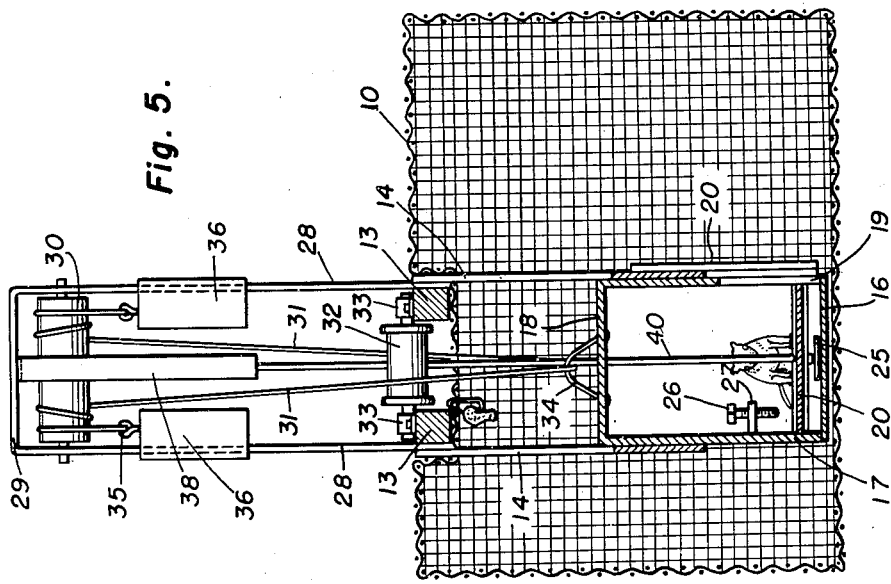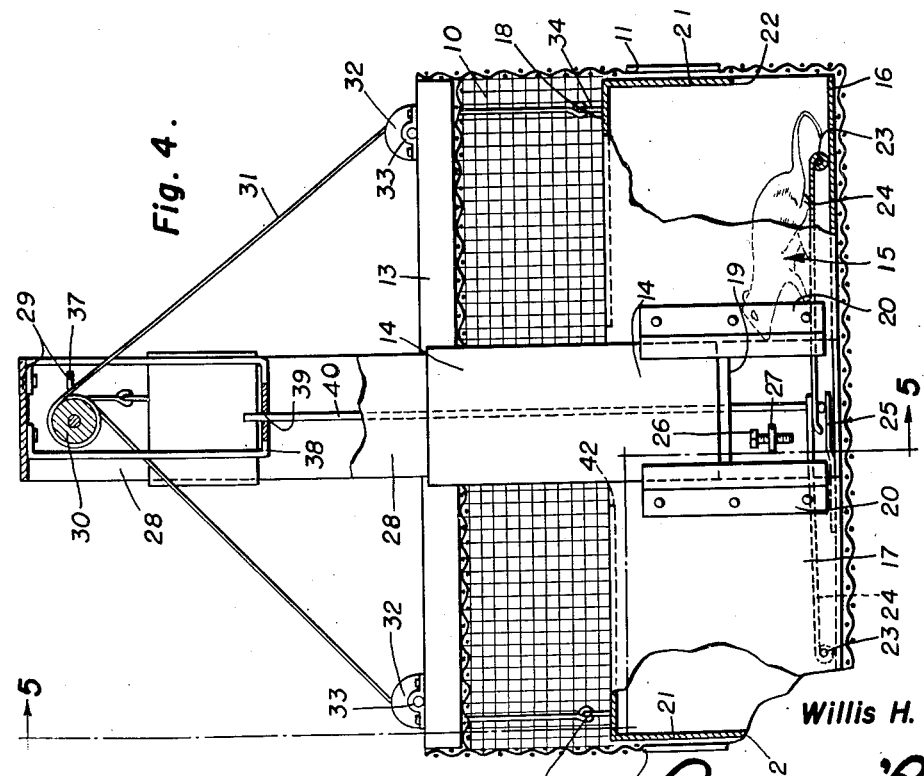

2,464,090

UNITED STATES PATENT OFFICE 2,464,090

RODENT TRAP

Willis H. Jordan, Houston, Tex.

Application January 7, 1947, Serial No. 720,617

1 Claim. (Cl. 43—68)

This invention relates to a rodent trap and has for its primary object a trap which will automatically re-set itself after having been operated by a rodent.

Another object is to entrap a plurality of rodents so that they may be disposed of as a group.

The above and other objects may be attained by employing this invention which embodies among its features a cage, an elevator mounted for vertical movement in the cage, said elevator having a door opening in each end, the cage having aligned door openings in spaced relation to its bottom which are adapted to align with the door openings in the elevator when the latter is raised, the elevator also having a door opening in one side wall through which a rodent may escape into the interior of the cage, and means for closing the door opening in the side of the elevator when the cage is raised.

Other features include rodent released elevator sustaining means to hold the elevator in raised position and a counterbalance to raise the elevator into rodent receiving position after a rodent has escaped from the elevator into the cage.

In the drawings,

Figure 1 is a top plan view of a rodent trap embodying the features of this invention, Figure 2 is a longitudinal sectional view taken substantially along the line 2—2 of Figure 1, Figure 3 is a transverse sectional view taken substantially along the line 3—3 of Figure 2, Figure 4 is a view similar to Figure 2 illustrating the elevator in lowered position, Figure 5 is a transverse sectional view taken substantially along the line 5—5 of Figure 4, and Figure 6 is a horizontal sectional view taken substantially along the line 6—6 of Figure 1.

Referring to the drawings in detail, this improved rodent trap comprises a cage 10 which in its preferred form is rectangular in formation. Formed in opposite end walls of the cage 10 are aligning door openings 11 and a suitable door 12 closes the top of the cage through which the trapped rodents may be extracted for destruction. As illustrated, the door openings 11 align with one another and are spaced horizontally from the bottom or floor of the cage.

Supported on a pair of spaced parallel cross bars 13 substantially midway between the aligned door openings 11 are depending arms 14 which extend downwardly toward the bottom or floor of the cage and terminate in a plane substantially coincidental with the bottom ends of the door openings 11. Mounted for vertical sliding movement between the arms or guides 14 is an elevator designated generally 15 comprising a bottom 16 from opposite side edges of which extend upwardly parallel side walls 17 joined at their upper ends by a top wall 18 to form a substantially tubular structure of rectangular cross section. Formed in one of the side walls 17 is a door opening 19 which extends from the bottom 16 to a point substantially midway between the upper and lower end of its respective side wall. Guide flanges 20 are secured to the elevator adjacent each end wall of the door 19 and ride on the adjacent arm or guide 14 as will be readily understood upon reference to the drawings. Formed at each end of the tubular body forming the elevator 15 is an end wall 21 which, as indicated in Figures 2 and 4, extends downwardly toward the bottom wall 16 from the top 18 but terminates short of the bottom wall to form a door 22. These doors 22 are adapted when the elevator 15 is raised, to align with the door openings 11 in order to facilitate the entrance of a rodent into the trap. Pivotally supported as at 23, between the center of the elevator and opposite ends thereof are overlapping treadles 24 which are normally urged upwardly into the position illustrated in Figure 2 by means of a leaf spring 25 which is fixed to the bottom 16 of the elevator. These treadles are provided adjacent their free ends with elongated longitudinal slots which align with one another and serve as guides for the latch bar to be more fully hereinafter described. A set screw 26 is supported in a bracket 27 carried by one of the side walls 17, and is adapted to adjustably limit the upward movement of the treadles, under the influence of the spring 25.

Extending upwardly from the supporting bars 13 in substantial alignment with the guide members 14 are standards 28 which are joined at their upper ends by a cross bar 29. A transversely extending roller 30 is journalled in the standards 28 near their upper ends, and wound about said roller are cables 31, one end of each of which is led over a guide roller 32 journalled as at 33 adjacent each end of the cage 10, and is attached as at 34 to the top wall 18 of the elevator 15. The opposite end of each cable is connected as at 35 to a counterweight 36 which is slidably mounted on its respective standard 28, and is so balanced that the weight of the two counterweights 36 is just sufficient to cause the elevator 15 to move upwardly on its guides into position to bring the door openings 22 thereof into alignment with the door openings 11 of the cage 10. A stop arm 37 extends radially from the roller 30 substantially midway between opposite ends for engagement with the latch bar to be more fully hereinafter described.

Depending from the cross bar 29 between the standards 28 is a yoke 38 having an opening 39 in the bottom wall thereof which serves as a guide for a latch bar 40. The opening 39 aligns axially with the slots in the treadles 24 and mounted for sliding movement through the yoke 38 and the slots is the latch bar 40 having at its lower end a head 41 which rests upon the spring 25 as illustrated in Figures 2 and 4 so that when the treadles 24 are depressed against the urge of the spring 25 the latch bar 40 will be moved downwardly. As illustrated, the top 18 of the elevator is provided intermediate its ends with an enlarged opening 42 to accommodate not only the latch bar 40, but also a bait hook 43 which is suspended from the top of the cage and enters the interior of the elevator 15 as will be readily understood upon reference to Figure 3.

In use, it will be understood that bait is suspended on the bait hook 43 within the elevator 15 and a rodent being attracted by the bait will enter the door openings 11 and 22 at one end of the trap. Approaching the bait which is suspended midway between opposite ends of the elevator, the rodent will encounter one of the treadles 24 and due to the leverage exerted thereon the weight of the rodent will eventually cause the treadles to move downwardly thereby exerting pull on the latch bar 40 to cause it to move downwardly and disengage the arm 37. Such disengagement of the arm will permit the roller 30 to rotate due to the downward pull exerted by the weight of the rodent on opposite ends of the elevator so as to lift the counterweights 36. As the elevator lowers, the end walls 21 will serve to close the door openings 11 and the rodent will be trapped within the elevator. Upon reaching its lowermost position, the door opening 29 will be completely opened by reason of its passage beyond the lower end of the adjacent guide 14, and the rodent may escape from the elevator into the cage 10. With the escape of the rodent from the elevator, the spring 25 returns the treadles 24 and the latch bar 40 to their initial positions, and simultaneously the weights 36 will move the elevator upwardly until the door openings 22 align with the door openings 11 and the trap is then ready for a repeat operation. It will thus be seen that the trap automatically re-sets itself without requiring manual attention for this purpose and consequently need only be attended periodically at more-or-less infrequent intervals. In fact, the only servicing necessary is the removal of the trapped rodents through the door 12 and under circumstances that will enable them to be destroyed or otherwise disposed of.

While in the foregoing there has been shown and described the preferred embodiment of this invention it is to be understood that minor changes in the details of construction, combination and arrangement of parts may be resorted to without departing from the spirit and scope of the invention as claimed.

I claim:

A rodent trap which includes a cage having aligned oppositely disposed door openings in opposite walls in horizontally spaced relation to its bottom, an inverted U-shaped frame entering the cage through its top substantially midway between the walls having the door openings, an elevator mounted in the cage to slide vertically, said elevator having door openings in its end walls which when the elevator is raised align with the door openings in the cage, counterweights slidable on the legs of the U-shaped frame above the elevator, a roller journalled in the frame near its upper end, flexible cables wound around the roller, one end of each cable being attached to the cage, the opposite end of each cable being attached to a counterweight, a stop arm carried by the roller, a latch bar carried by the elevator for engaging the stop arm and holding the roller against turning in a direction to lower the elevator, a pair of overlapping treadles carried by the elevator and operably coupled to the latch bar so that when the treadles are depressed under the weight of a rodent the latch bar will disengage the stop arms to permit the elevator to lower under the weight of the rodent, the elevator having a door in one side and an arm depending from the top of the cage adjacent the side of the elevator having said door opening for closing said door opening when the elevator is raised.

WILLIS H. JORDAN.

REFERENCES CITED

The following references are of record in the file of this patent:

UNITED STATES PATENTS

| Number | Name | Date |
|---|---|---|
| 2,246,011 | Russell | June 17, 1941 |